United States Patent [19]

Petersen et al.

[11] 4,284,111

[45] Aug. 18, 1981

[54] WOOD LATHE TOOL

[75] Inventors: Paul S. Petersen, Minnetonka; Robert A. Holdahl, Hopkins, both of Minn.

[73] Assignee: Toolmark Co., Minneapolis, Minn.

[21] Appl. No.: 96,220

[22] Filed: Nov. 20, 1979

[51] Int. Cl.³ .............................................. B23B 29/06
[52] U.S. Cl. ...................................... 142/56; 82/36 R; 157/13
[58] Field of Search ................... 82/36 R; 142/56, 55, 142/47–49; 157/13

[56] References Cited

U.S. PATENT DOCUMENTS

| 1,239,486 | 9/1917 | Highams | 142/56 |
| 1,404,118 | 1/1922 | Hargraves | 157/13 |
| 1,723,221 | 8/1929 | Vandervoort et al. | 157/13 |
| 1,991,051 | 2/1935 | Cook | 142/56 |
| 2,986,177 | 5/1961 | Markin | 142/56 |
| 3,196,720 | 7/1965 | Streckfus | 82/36 R |
| 3,204,671 | 9/1965 | Schoenrock | 142/7 |
| 3,985,049 | 10/1976 | Streckfus | 82/36 R |
| 4,126,165 | 11/1978 | Guignard et al. | 142/56 |

Primary Examiner—Leonidas Vlachos
Attorney, Agent, or Firm—Kinney, Lange, Braddock, Westman and Fairbairn

[57] ABSTRACT

A tool for use in wood lathes which comprises a blade formed into a U shape with one edge of the closed end of the U forming the cutting edge. The tool includes suitable depth guards and a chip reflector to provide for safe and depth regulated cutting that leaves a smooth surface on the wood.

7 Claims, 5 Drawing Figures

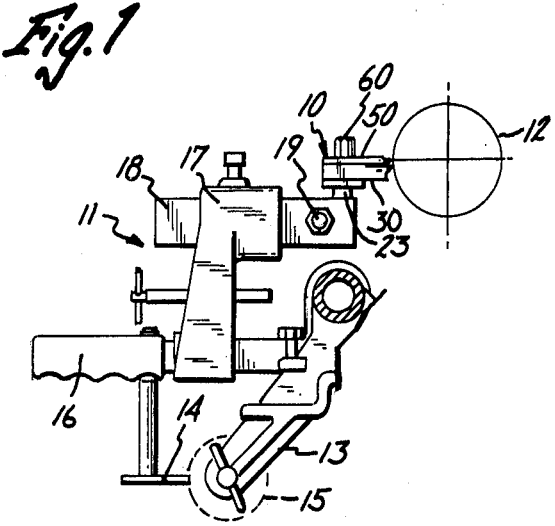
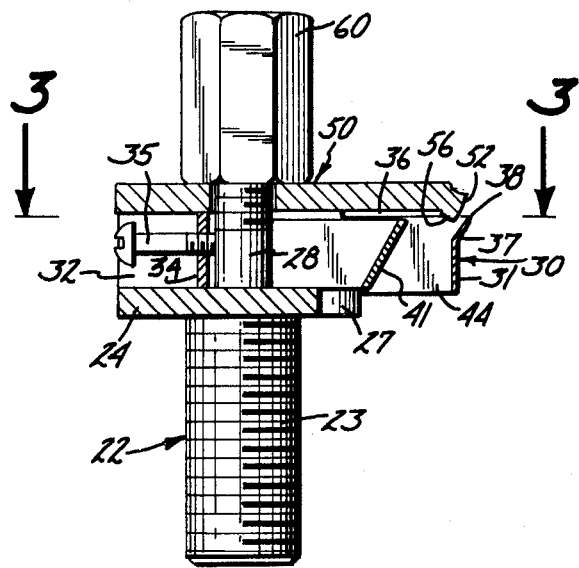
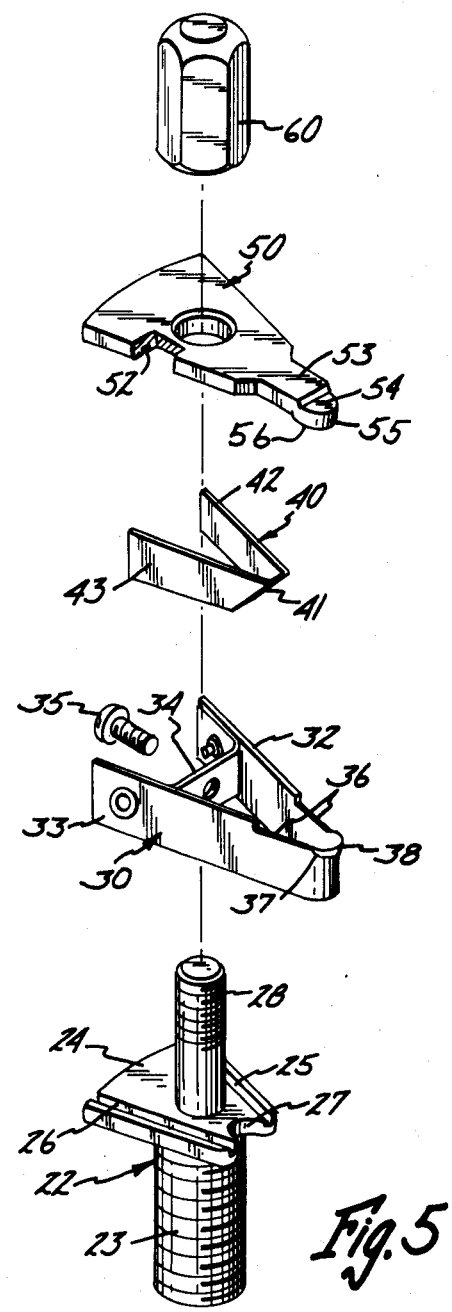
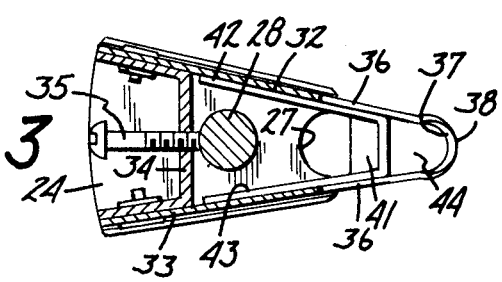
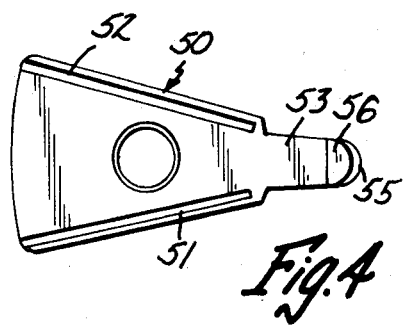

WOOD LATHE TOOL

BACKGROUND OF THE INVENTION

1. Field of the Invention

The present invention relates to a tool for use in wood working machines such as lathes.

2. Prior Art

A cutting tool for cutting grooves in the rubber rollers is shown in U.S. Pat. No. 3,985,049. The tool consists of a generally "squared" bottom U shaped cutting blade that has a planar or flat end wall with a sharp edge at the closed end of the U, and which is mounted so the end wall acts as a scoop. It is designed to cut helical grooves in a rubber roller. The blade is supported by fastening the planar portions of the side legs of the U to a support. It should be noted that a type of depth regulator is provided for the blade, but it is not used as a support and guard for the blade which also helps to stabilize the blade.

The use of depth regulating devices for lathe cutting tools is shown in U.S. Pat. No. 4,126,165. However in this patent the lathe cutting tool itself is an ordinary chisel type tool. The assembly has an adjustable gage member that aids in keeping the cutting blade from penetrating too deeply. Additionally, U.S. Pat. No. 1,991,051 illustrates a duplicating tool for use in lathes or the like, which has a cutting tool formed from a tube, and which includes an overlying depth control member having a rounded end generally shaped to correspond to the tube. The tube has a rounded cutting edge that is used for engaging the work. The mounting of the tool is also along the planes of the side legs and there is no chip deflector nor a guard overlying and aiding in reinforcing the cutting blade.

U.S. Pat. No. 2,986,177 shows a type of a wood working lathe tool which has a trough that deflects wood chips upwardly and which can be used in connection with a tool rest. This tool also has a member that tends to limit the amount of penetration of the tool. The tool has a rounded forward edge as shown in FIG. 11 of the patent, as well as other configurations shown in the patent, but it does not comprise a flat blade bent into a generally U shaped form so that chips will be deflected downwardly.

SUMMARY OF THE INVENTION

The present invention relates to a U shaped cutting tool including mounting means for a blade portion having a guard that also limits the depth of penetration of the tool into the workpiece, while permitting a shaving cut to be taken. The blade portion is low cost, and therefore can be disposed of when it becomes dull. The blade can be made of very high quality steel which does not dull easily. The mounting assembly clamps and holds the blade extremely rigidly to prevent "chatter" or deflection. The tool is particularly adapted for use with lathe duplicators, which are attachments that follow a pattern on a lathe and cut a workpiece in the shape of the pattern.

A smooth surface finish is obtainable at slow cutting speeds with the extra sharp, thin edge of the cutting blade disclosed. Higher speeds are necessary only for finishing cuts, and such finishing cuts are so smooth that only a minimum amount of sanding is required.

A significant safety factor is introduced by permitting most work to be performed at lower rotating speeds.

BRIEF DESCRIPTION OF THE DRAWINGS

FIG. 1 is a reduced size part schematic view of a typical installation for using the cutting tool of the present invention on a duplicator arrangement;

FIG. 2 is a vertical sectional view of the cutting tool shown in FIG. 1;

FIG. 3 is a sectional view taken as on line 3—3 in FIG. 2;

FIG. 4 is a bottom view of the blade guard utilized with the present invention looking in opposite direction along the sight line 3—3 from the arrow direction; and FIG. 5 is an exploded view showing the components of the present invention.

DESCRIPTION OF THE PREFERRED EMBODIMENT

Referring first to FIG. 1, a typical schematic arrangement is shown for a lathe tool assembly of the present invention indicated generally at 10 which is shown mounted on a duplicator assembly 11 used in connection with a lathe that supports a workpiece indicated at 12. The duplicator assembly 11 can be mounted onto a lathe in a known manner, for example, the duplicator assemblies sold by Toolmark Co., 6840 Shingle Creek Parkway, Minneapolis, Minn. are satisfactory. Duplicator assemblies are also shown in U.S. Pat. No. 3,204,671. The duplicator assemblies include a pattern support bracket 13 and a stylus 14 that engages and follows a pattern 15 mounted in the support 13. By manipulating a hand grip 16, the movement of the stylus along the pattern provides corresponding movement of a tool bar support 17. A tool bar 18 is mounted on the tool bar support. The cutting tool assembly 10 of the present invention is mounted at the outer end of the tool bar 18, and as shown is threaded in place and held also with a clamp bolt 19 that clamps the tool assembly to the tool bar. The cutting tool of the present invention can be used with any desired type of lathe operation, but does perform particularly well with duplicators.

The cutting tool assembly 10 is shown in greater detail in FIGS. 2 through 5. The exploded view, FIG. 5 shows the various individual components that form the assembly. The components include a base assembly 22, which includes a lower stud 23 that mounts onto the tool bar 18; a blade base 24, which is fixed to the stud 23; and an upper stud 28. The blade base 24 is a generally planar member that has a pair of grooves indicated at 25 and 26, respectively, which are of size to receive the edges of a generally "U" shaped blade 30 as shown in FIG. 5. The blade 30 is formed from a flat strip of material to have a rounded end wall 31 and side legs 32 and 33.

The side legs 32 and 33 of blade 30 as shown extend from the rounded (part cylindrical), narrow end wall 31 and diverge in direction away from the end wall 31. The grooves 25 and 26 mate with and support the lower edges of the side legs. A brace or cross piece 34 is fastened between legs 32 and 33 adjacent the end of the legs opposite wall 31. The cross piece 34 has a threaded aperture through which an adjustment screw 35 may be threaded if desired. The sides of base plate 24 also taper together in direction toward wall 31. The base plate terminates short of wall 31. A recess 27 is provided in the narrow end of base plate 24 for chip clearance.

The end wall 31 of the blade 30 and adjacent portion of legs 31 and 32 have their upper edges recessed as indicated at 36 so the edges are below the plane defined by the upper edges of the main parts of the legs 32 and 33. The upper edge portion of wall 31 is formed so that it protrudes outwardly from the wall 31 to form a lip 37. The upper edge 38 of lip 37 is sharpened along an arc of about 160° to 180°, which sharpened edge is centered on the bisecting plane passing between the legs 32 and 33. This lip 37 therefore has the sharp upper edge 38 that forms the cutting edge for the blade 30. In the tool assembly, a chip deflector 40 is provided and as shown it has an inclined generally planar front wall 41 and a pair of diverging legs 42 and 43 that fit between the legs 32 and 33. The front wall 41, as can be seen in FIG. 2, however, is spaced from the wall 31 at the rounded end of the blade to form a passageway indicated generally at 44 (FIGS. 2 and 3) through which chips are deflected as the cutting action occurs.

An upper blade guard plate 50 is provided for supporting the upper edges of the legs 32,33 and also for holding the chip deflector 40 in position. The blade guard plate 50 is a generally planar member that has side grooves or recesses 51 and 52, respectively, that are of length to receive the upper edges of the legs 32 and 33 and to retain the edges when the blade guard plate is ·clamped into position in the asembly. The leading or forward end section of the blade guard plate indicated at 53 is narrowed down so that the side walls of the end section 53 are substantially the same width as the outer surfaces of the legs 32 and 33, which they overlie. It should also be noted that the grooves 51 and 52 terminate generally at the point where the recesses 36 are provided on the legs 32 and 33, respectively.

The leading end 54 of the blade guard has a rounded surface 55, and it is "upset" or offset slightly from the general plane of the blade guard plate 50 so that end 54 protrudes downwardly slightly into the recess formed by the outwardly extending lip 37 of blade 30 on which the edge 38 is formed. This offset end forms a downwardly depending protrusion 56 that is spaced very closely to the edge 38 of the blade 30, thereby limiting the amount of penetration of the cutting edge 38 into a workpiece all along the sharpened arc of the cutting edge 38. Further, the protrusion 56 extending partially into the passageway 44 further guards the cutting edge from gouging or chattering.

A hold-down nut 60 threads onto the upper stud 28 and bears against the upper surface of the blade guard plate 50 to hold the blade 30 in its assembly.

The lower edges of the legs 32 and 33 fit down into the grooves 25 and 26 of the base 24 for good lateral support, and the chip deflector 40 is placed in position as shown in FIG. 2 prior to the time that the blade guard plate 50 is moved into position. The grooves 51 and 52 of blade guard plate 50 are made to receive and hold the upper edges of the legs 32 and 33 of the blade when the nut 60 is threaded down to clamp the assembly together. This clamping action provides great stability for the outer end wall 31 of the blade and the lip 37, which is flared out from end wall 31. There is no tendency of substantial side to side movement of this outer end wall primarily because of the geometry of the blade legs, as well as the clamping at the top and bottom of the legs.

When the blade legs are supported only along their side surfaces there is more likelihood of bending in side to side direction, as well as a greater likelihood of "play" tending to rotate or "tip" the blade about a horizontal axis from the cutting force. The forces on the blade of the present invention which are generally considered to be vertical downward on the cutting edge, are reacted along the lengths of the legs 32 and 33 that are supported by the base plate 24 and guard plate 50. The clamping of parts 24 and 50 holds the legs very securely without any tendency of the legs to slide or "work" loose. The force from the nut 60 directly adjusts the force tending to hold the blade stable, so adjustments are easily accommodated.

The passageway 44 provides for adequate chip clearance, and the chip deflector wall 41 tends to deflect the chips downwardly. The lower base plate 24 terminates short of the outer end wall 31 of the blade so that the chips can easily pass downwardly. The passageway 44 provided by the chip deflector wall 41 and the outer end wall 31 of the blade makes it very easy to place a vacuum collector for chips directly underneath the blade to receive the chips and carry them away under vacuum.

The cross piece 34 provides additional stability. The screw 35 can be used against stud 28 for very limited adjustment of the blade to move the cutting edge 38 slightly with respect to the outer rounded end 52 of the blade guard plate. This adjustment is very small, because the grooves 25 and 26, and 51 and 52 are made to securely hold the blade and also because the grooves and the blade legs are not parallel, but diverge from the outer rounded end wall 31 and the amount of movement in the direction controlled by the screw 35 has to be limited for proper operation. However, very small adjustment can make quite a difference in the depth of cut of the cutting edge 38, and these adjustments then provide for accommodating some wear or for manufacturing variations in the parts.

It also should be noted that the lower surface of the guard plate 50 is very close to the edges of the legs at the recess portions 36 to prevent splinters or chips from jamming in between the blade and the guard plate and causing damage. In short, the guard plate restricts the passage size between the blade and the guard around the upper edge of the narrow end portion of the blade in the region of recess 36 to a gap that is no greater than the space right at the cutting edge 38 so that chips will not get under the guard plate and cause problems.

The inclined wall 41 of the chip deflector insures that the chips will be deflected downwardly rather than back in toward the stud 28 when in use. This reduces the amount of dust and chips in the work area, and it increases work visibility, as well as facilitating vacuum collection of the chips.

The tool blade 30 can be made of a hardened tool steel and can be sharpened to be substantially razor sharp. The cutting edge 38 will not lose its sharpness nearly as quickly as ordinary carbon steel tools do at high cutting speeds. The blades are heat treated to file hardness, but retain high strength due to the use of a premium high speed molybdenum alloy tool steel normally reserved for production of metal working tools. Most wood working tools are of carbon steel, and do not retain a cutting edge as well as the thin blade of the high quality tool steel used with the present invention.

What is claimed is:

1. A wood cutting tool assembly comprising a blade member formed of a thin bar of material bent into a generally U shape and having a rounded end wall and side legs extending from said rounded end wall to define a space between the legs, said legs and rounded end wall having upper and lower edges, the upper edge of said rounded end wall being sharpened to form an upwardly facing cutting edge, means to support said blade comprising a base engaging the lower edge of said legs, a guard plate engaging the upper edge of said legs, means to exert a clamping force on said base and guard plate to clamp and support the legs during use, said guard plate overlying said blade and having a nose portion closely overlying the rounded end wall adjacent said cutting edge to limit the amount of space between said guard plate and said cutting edge and thereby limit the depth of cut of said cutting edge, and a chip deflector including a deflector wall extending between said legs and spaced from the rounded end wall to define a chip channel, said deflector wall being inclined in direction away from the rounded end wall and in direction away from the cutting edge.

2. The combination as specified in claim 1 wherein the upper edge of the rounded end wall of said blade is bent outwardly to form a lip, the upper edge of said lip being the edge sharpened to form the cutting edge.

3. The combination as specified in claim 1 or 2 wherein said legs diverge from said rounded end wall.

4. The combination as specified in claim 1 wherein said base and said guard plate both have grooves to receive the edges of the legs of said blade member.

5. The combination as specified in claim 1 wherein said pair of members are held together with a stud passing through both of said members and positioned between said legs, a nut on said stud engaging the upper of said members to urge said members together, said legs having a transverse support extending therebetween and fixed thereto, said stud being between said transverse support and the rounded end wall of said blade.

6. The combination as specified in claim 5 and a threadable adjustable means mounted in said transverse support and engaging said stud, whereby threading said adjustable means permits movement of the rounded end wall relative to said stud a limited distance.

7. The combination as specified in claim 6 and a support stud extending below said base and being adapted to be mounted in a machine tool.

* * * * *